United States Patent
Toyama et al.

(10) Patent No.: US 11,358,541 B2
(45) Date of Patent: Jun. 14, 2022

(54) VEHICLE SOUNDPROOFING STRUCTURE

(71) Applicant: Toyota Jidosha Kabushiki Kaisha, Toyota (JP)

(72) Inventors: Noritaka Toyama, Anjo (JP); Atsuko Kobayashi, Nagoya (JP); Keiko Nagatomi, Toyota (JP); Keisuke Ito, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 609 days.

(21) Appl. No.: 16/257,312

(22) Filed: Jan. 25, 2019

(65) Prior Publication Data

US 2019/0248304 A1 Aug. 15, 2019

(30) Foreign Application Priority Data

Feb. 15, 2018 (JP) .............................. JP2018-024854

(51) Int. Cl.
*B60R 13/08* (2006.01)
*G10K 11/162* (2006.01)
*G10K 11/178* (2006.01)

(52) U.S. Cl.
CPC ........ *B60R 13/0815* (2013.01); *G10K 11/162* (2013.01); *G10K 11/178* (2013.01)

(58) Field of Classification Search
CPC . G10K 11/162; G10K 11/178; B60R 13/0815
See application file for complete search history.

(56) References Cited

U.S. PATENT DOCUMENTS

| | | | |
|---|---|---|---|
| 9,847,081 B2* | 12/2017 | Oswald | H04S 7/302 |
| 10,440,467 B1* | 10/2019 | You | B60R 11/0241 |
| 2003/0091806 A1 | 5/2003 | Staelgraeve et al. | |
| 2015/0137998 A1* | 5/2015 | Marti | G10K 11/1754 |
| | | | 340/901 |
| 2015/0195641 A1* | 7/2015 | Di Censo | H04R 1/1083 |
| | | | 381/71.6 |
| 2016/0379621 A1* | 12/2016 | Marti | B60C 9/00 |
| | | | 381/71.4 |
| 2018/0261200 A1* | 9/2018 | Kang | G10K 11/17875 |
| 2018/0277090 A1* | 9/2018 | Christoph | G10K 11/17857 |
| 2019/0013004 A1* | 1/2019 | Vinamata | G10K 11/1783 |

FOREIGN PATENT DOCUMENTS

| | | | |
|---|---|---|---|
| JP | H07149146 A | 6/1995 | |
| JP | H08314471 A | 11/1996 | |
| JP | H10331556 A | 12/1998 | |
| JP | H11032904 A | 2/1999 | |
| JP | 11-165535 A | 6/1999 | |
| JP | H11245662 A | 9/1999 | |
| JP | 2000-356385 A | 12/2000 | |
| JP | 2005-509756 A | 4/2005 | |

* cited by examiner

*Primary Examiner* — Forrest M Phillips
(74) *Attorney, Agent, or Firm* — Dinsmore & Shohl LLP

(57) ABSTRACT

A vehicle soundproofing structure includes: a soundproofing mechanism configured to suppress sound from leaking outside from a vehicle by absorbing, dissipating, or cancelling sound inside a vehicle cabin, and a controller configured to enable operation of the soundproofing mechanism when the vehicle is stationary, and to disable operation of the soundproofing mechanism when the vehicle is travelling.

5 Claims, 9 Drawing Sheets

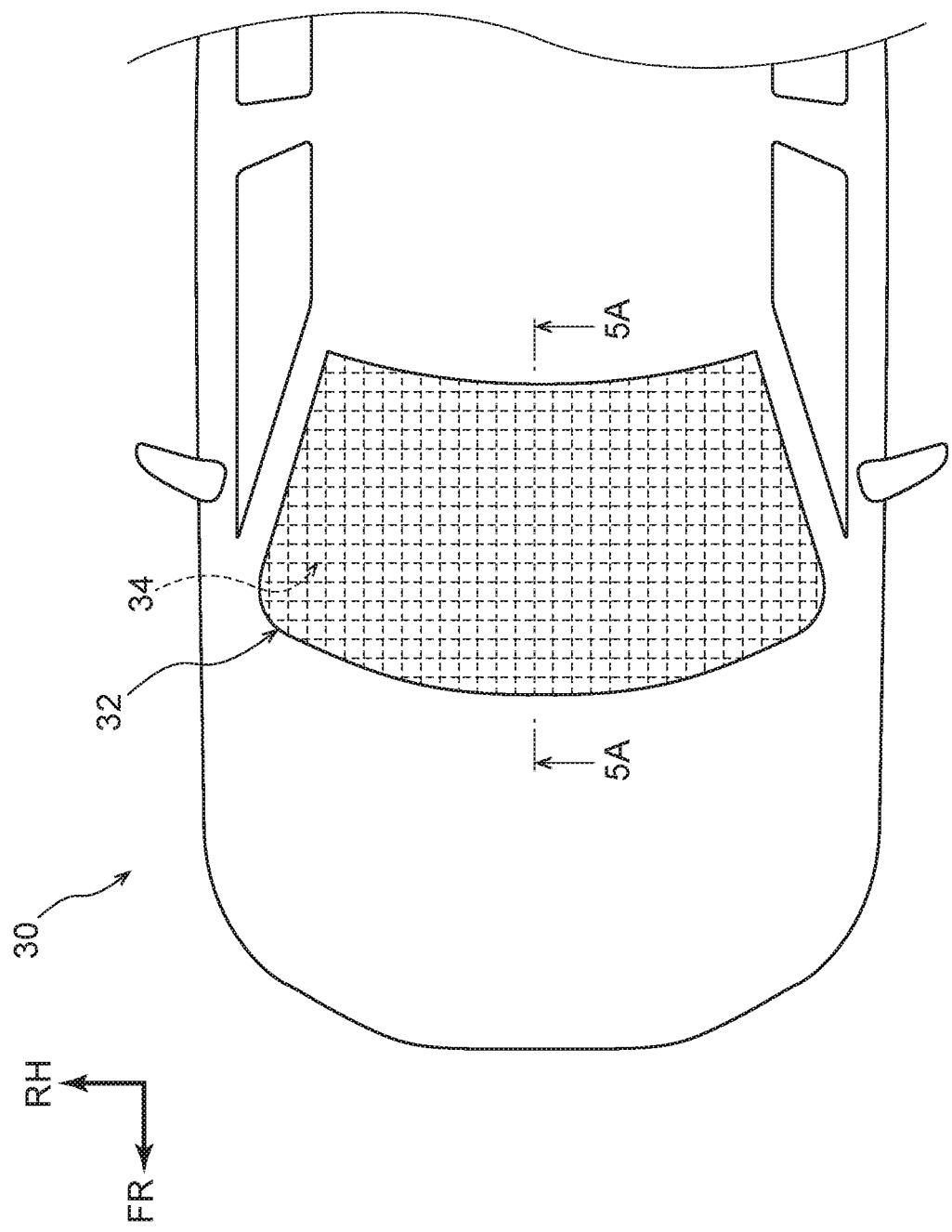

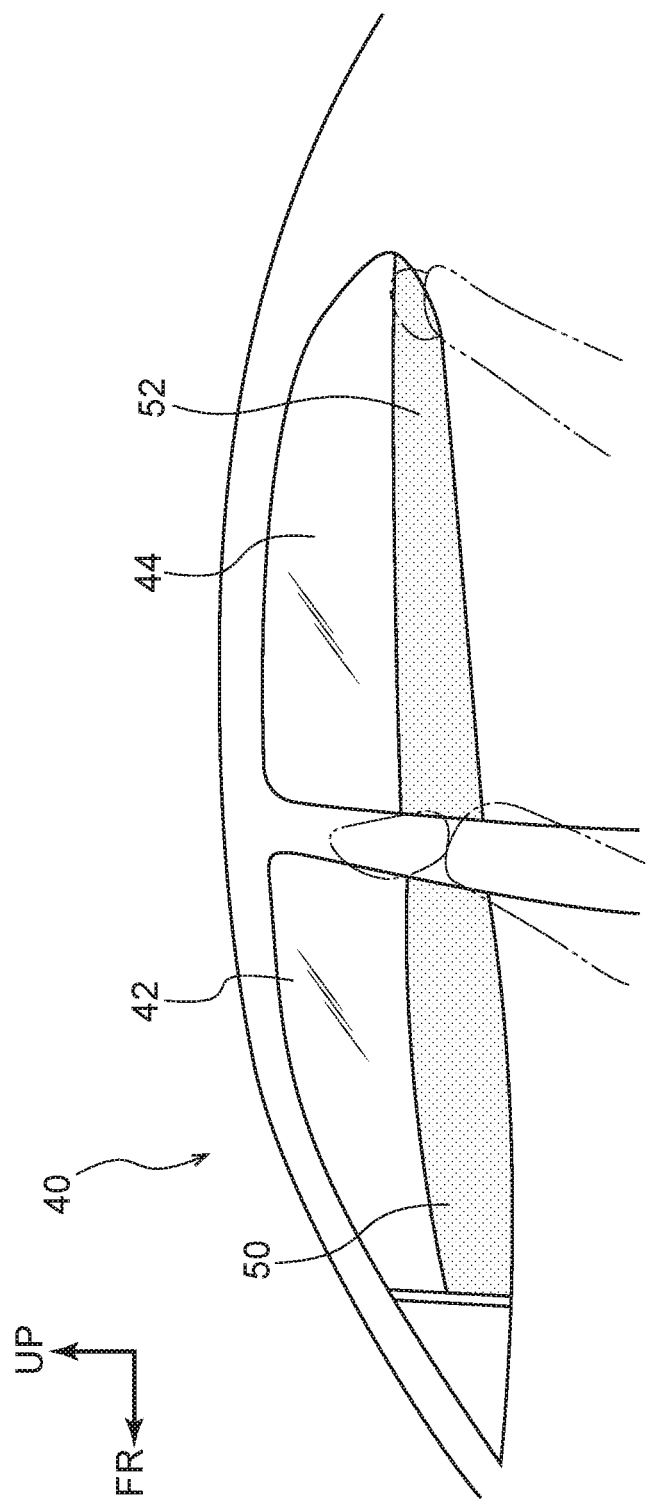

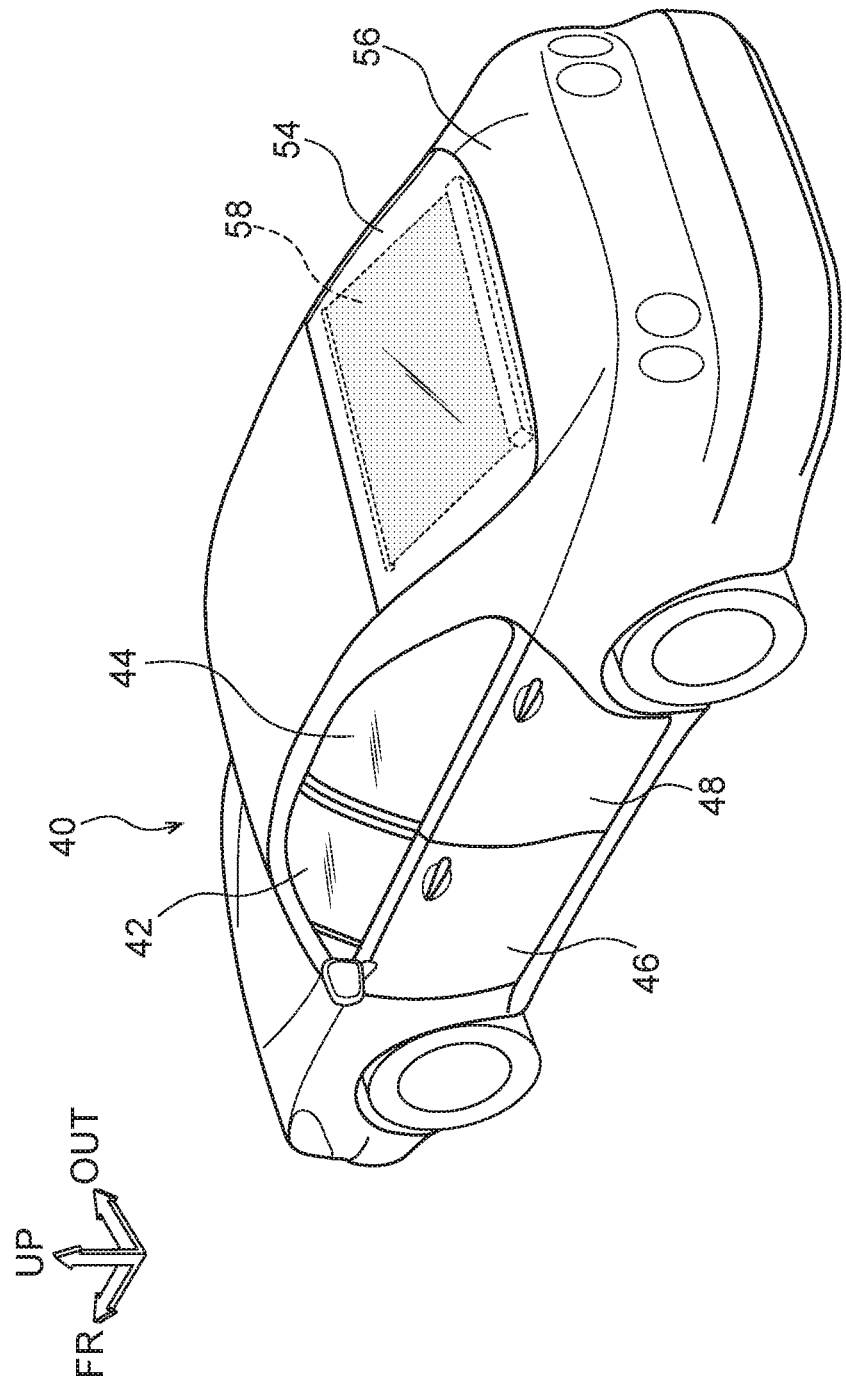

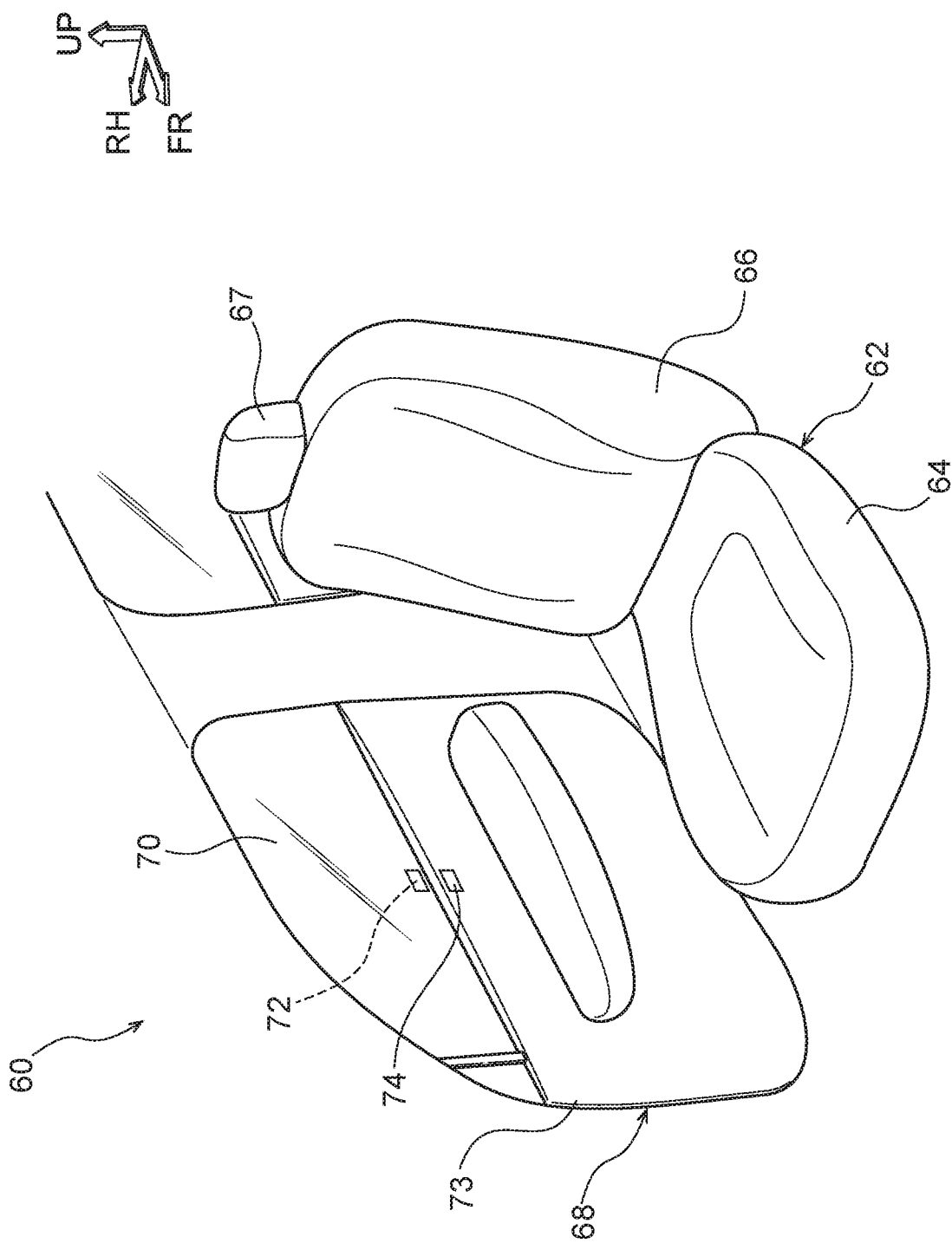

VEHICLE SOUNDPROOFING STRUCTURE

CROSS-REFERENCE TO RELATED APPLICATION

This application claims priority under 35 USC 119 from Japanese Patent Application No. 2018-024854, filed on Feb. 15, 2018, the disclosure of which is incorporated by reference herein.

BACKGROUND

Technical Field

The present disclosure relates to a vehicle soundproofing structure.

Related Art

Japanese National-Phase Publication No. 2005-509756 discloses a structure to enhance the soundproofing performance of a vehicle door by using a soundproofing door liner.

In Japanese National-Phase Publication No. 2005-509756, since a high soundproofing performance state is maintained, sound outside the vehicle is difficult to hear while the vehicle is traveling or the like, and there are demands for a vehicle capable of switching between a soundproof state and a non-soundproof state at a suitable timing.

SUMMARY

The present disclosure provides a vehicle soundproofing structure that may switch between a soundproof state and a non-soundproof state at a suitable timing.

A first aspect of the present disclosure is a vehicle soundproofing structure including: a soundproofing mechanism and a controller. The soundproofing mechanism is configured to suppress sound from leaking outside from a vehicle by absorbing, dissipating, or cancelling sound inside a vehicle cabin. The controller is configured to enable operation of the soundproofing mechanism when the vehicle is stationary, and to disable operation of the soundproofing mechanism when the vehicle is travelling.

The vehicle soundproofing structure according to first aspect includes the soundproofing mechanism to suppress sound from leaking outside from a vehicle and the controller to control the soundproofing mechanism. The controller enables operation of the soundproofing mechanism when the vehicle is stationary and disables operation of the soundproofing mechanism when the vehicle is travelling. Thus when the vehicle is stationary, sound inside the vehicle cabin is absorbed, dissipated, or cancelled by activating the soundproofing mechanism, enabling the sound to be suppressed from leaking outside from the vehicle.

Moreover, by disabling operation of the soundproofing mechanism while the vehicle is traveling, sound outside the vehicle when travelling may be suppressed from becoming difficult to hear.

In a second aspect of the present disclosure, in the above-described first aspect, the soundproofing mechanism may include an air moving device that blows air along a glass pane partitioning between an interior and an exterior of the vehicle cabin, and dissipates sound in a vicinity of the glass pane by blowing air out from the air moving device.

In the vehicle soundproofing structure according to the second aspect, the sound in the vicinity of the glass pane is dissipated by blowing air along the glass pane from the air moving device, and may suppress the sound from leaking outside from the vehicle.

In a third aspect of the present disclosure, in the above-described first aspect, the soundproofing mechanism includes a vibrator attached to a glass pane partitioning between an interior and an exterior of the vehicle cabin, and a microphone to receive sound inside the vehicle cabin. Vibrating the vibrator causes the glass pane to vibrate at a frequency corresponding to the sound received by the microphone and the sound to be cancelled.

In the vehicle soundproofing structure according to the third aspect, sound can be cancelled by vibrating the vibrator attached to the glass pane so as to vibrate the glass pane. Moreover, the frequency of the sound to be cancelled may be accurately ascertained due to receiving voices etc. inside the vehicle cabin using the microphone.

In a fourth aspect of the present disclosure, in the above-described first aspect, wherein the soundproofing mechanism includes a sunshade that is stowed so as to be deployable along a glass pane partitioning between an interior and an exterior of the vehicle cabin, and that is formed of a soundproofing material.

In the vehicle soundproofing structure according to the fourth aspect, as well as being able to block sunlight using the sunshade, the sound may also be suppressed from leaking outside from the vehicle thereby.

A fifth aspect of the present disclosure, in the first aspect, may further include: a pair of glass panes partitioning between an interior and an exterior of the vehicle cabin and disposed with a spacing between each other. The soundproofing mechanism is configured including a transparent member that is a deformable electrically conductive polymer actuator filled in a space between the glass panes, and soundproofs by deforming the transparent member to form an air layer between the glass panes.

In the vehicle soundproofing structure according to the fifth aspect, due to soundproofing by deforming the transparent member, the situation outside the vehicle may be viewed through the glass pane, even in the soundproof state.

The vehicle soundproofing structure according to the first aspect may switch between a soundproof state and a non-soundproof state at a suitable timing.

The vehicle soundproofing structure according to the second aspect enables sound in the vicinity of the glass pane to be dissipated so as to suppress the sound from leaking outside from the vehicle.

The vehicle soundproofing structure according to the third aspect may suppress the sound from leaking outside from the vehicle by cancelling sound inside the vehicle cabin.

The vehicle soundproofing structure according to the fourth aspect may suppress the sound from leaking outside from the vehicle while also blocking sunlight.

The vehicle soundproofing structure according to the fifth aspect may suppress the sound from leaking outside from the vehicle while also enabling the situation outside the vehicle to be viewed.

BRIEF DESCRIPTION OF THE DRAWINGS

Exemplary embodiments of the present disclosure will be described in detail based on the following figures, wherein:

FIG. 4 is an upper face view of a vehicle installed with a vehicle soundproofing structure according to a second exemplary embodiment, in a state in which a soundproofing mechanism is being operated;

FIG. 7 is a side view of a vehicle installed with a vehicle soundproofing structure according to a third exemplary embodiment;

FIG. 8 is a perspective view of a vehicle installed with a vehicle soundproofing structure according to the third exemplary embodiment, as viewed obliquely from the rear, and FIG. 9 is a perspective view of the inside of a vehicle cabin of a vehicle installed with a vehicle soundproofing structure according to a fourth exemplary embodiment.

DETAILED DESCRIPTION

First Exemplary Embodiment

Figure 1:
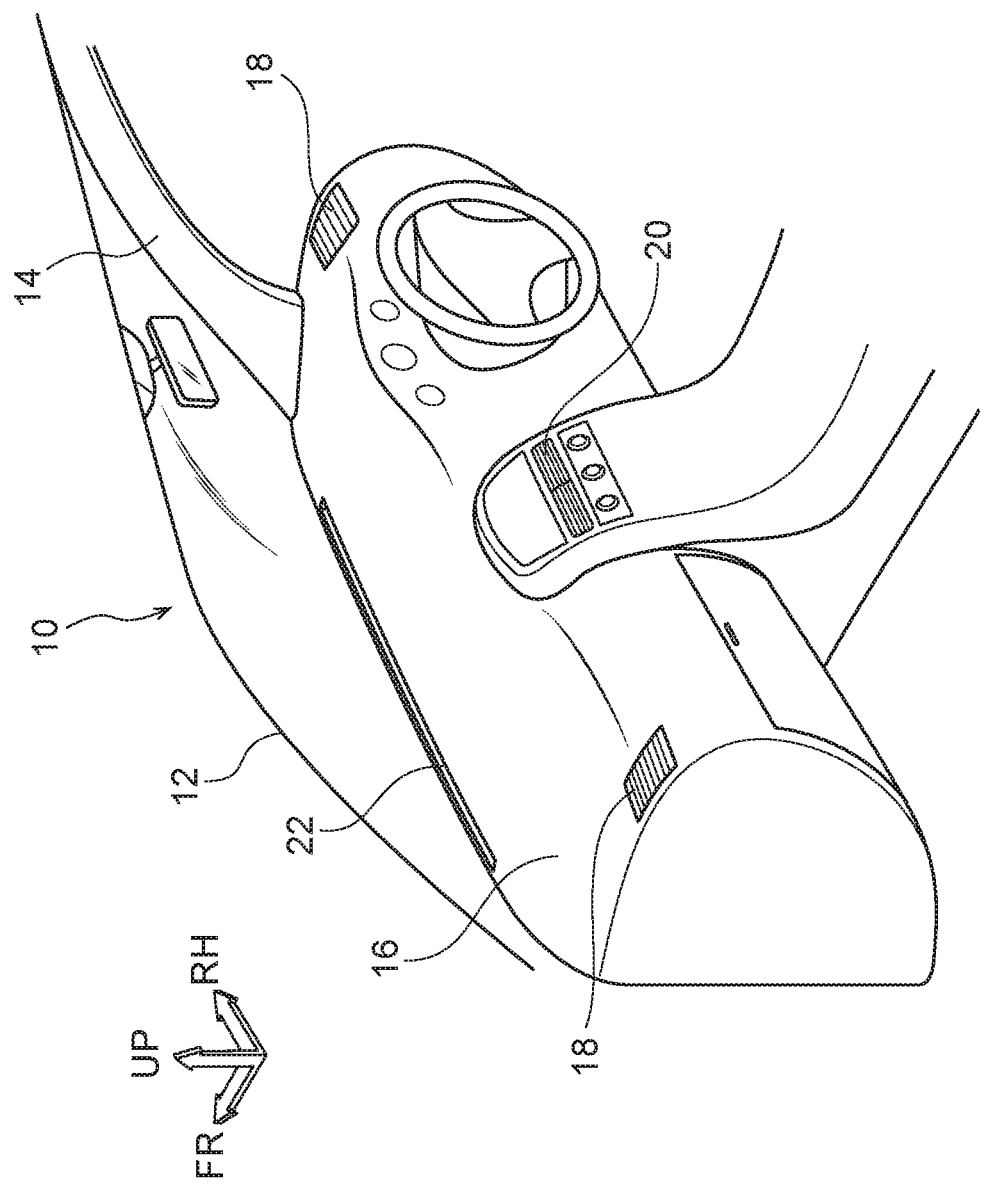
FIG. 1 is a perspective view illustrating a front section inside a vehicle cabin of a vehicle installed with a vehicle soundproofing structure according to a first exemplary embodiment.
Figure 2:
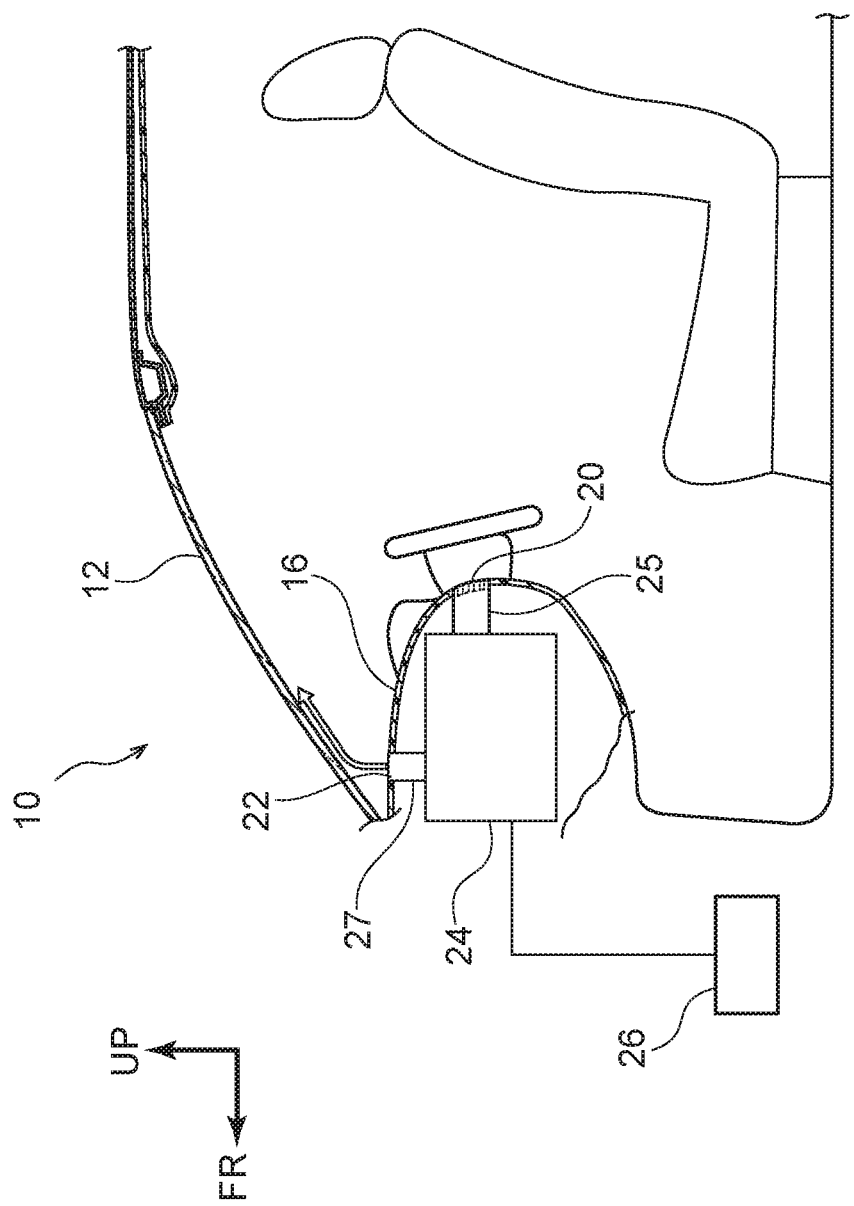
FIG. 2 is a side view illustrating an air conditioning unit configuring a vehicle soundproofing structure according to the first exemplary embodiment.
Figure 3:
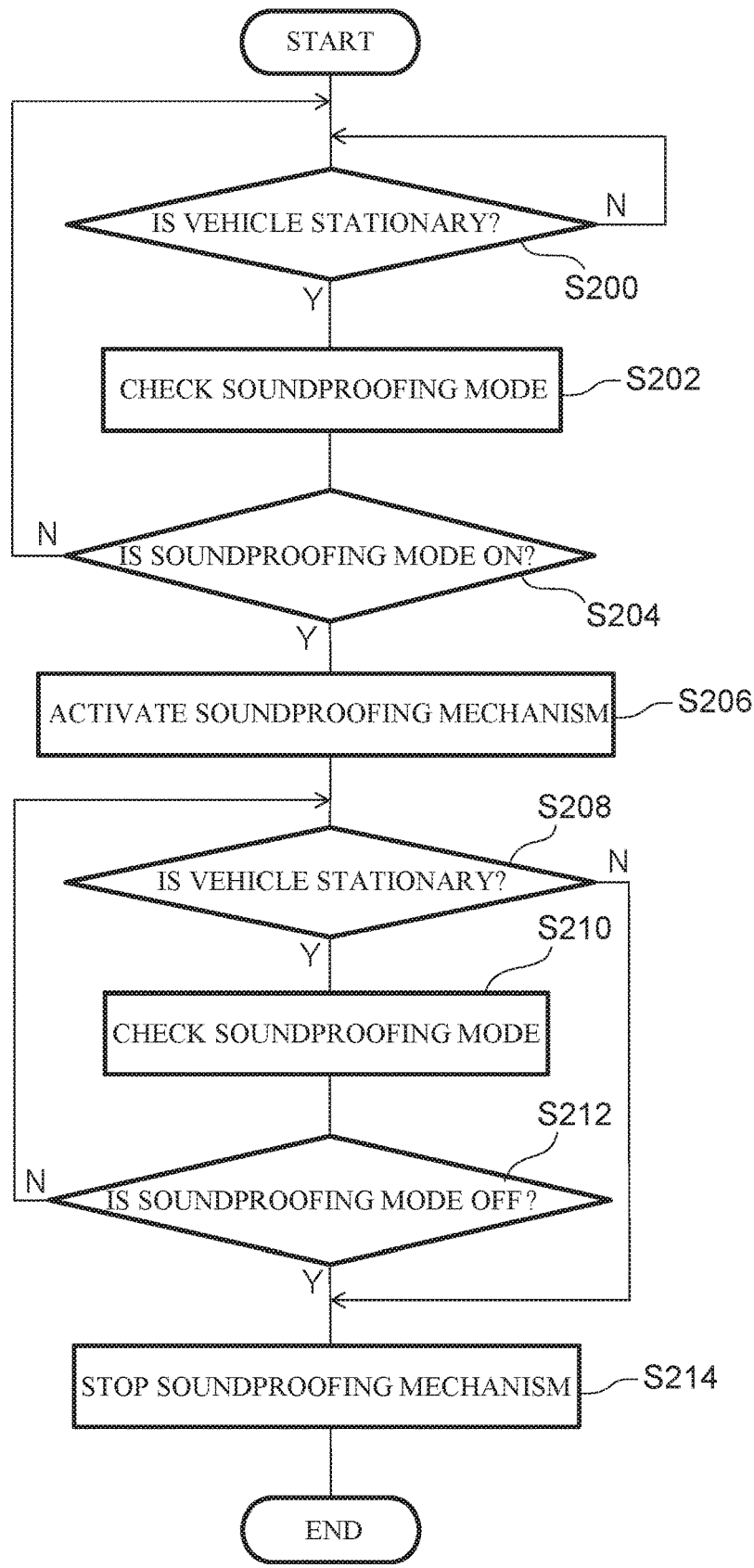
FIG. 3 is a flowchart illustrating an operational flow of a soundproofing mechanism according to the first exemplary embodiment.

Explanation follows regarding a vehicle soundproofing structure according to a first exemplary embodiment, with reference to FIG. 1 to FIG. 3. Note that in each of the drawings, the arrow FR indicates the front of a vehicle, the arrow UP indicates the vehicle upper side, and the arrow RH indicates the vehicle right side, as appropriate. In the below explanation, unless specifically stated otherwise, reference to the front and rear, up and down, and left and right directions refers to the front and rear in the vehicle front-rear direction, up and down in the vehicle vertical direction, and left and right when facing the direction of travel.

As illustrated in FIG. 1, a windshield glass 12 is provided partitioning between the interior and exterior of a vehicle cabin at a front section of a vehicle 10 equipped with the vehicle soundproofing structure according to the present exemplary embodiment. The windshield glass 12 extends along the vehicle width direction and vehicle vertical direction, and the two vehicle width direction end portions of the windshield glass 12 are respectively attached to front pillars 14. A bottom edge of the windshield glass 12 is connected to an instrument panel 16.

The instrument panel 16 is provided to a front section of the vehicle cabin interior. Side blower outlets 18 are respectively formed in the two vehicle width direction end portions of the instrument panel 16. Air that has been regulated in temperature by an air conditioning unit 24 serving as an air moving device, described later, is blown out into the vehicle cabin through the side blower outlets 18. A central blower outlet 20 is also formed in a vehicle width direction center portion of the instrument panel 16. Air that has been regulated in temperature by the air conditioning unit 24, described later, is blown out into the vehicle cabin through the central blower outlet 20.

A defroster blower outlet 22 is formed in an upper face of the instrument panel 16 at the base of the windshield glass 12. The defroster blower outlet 22 is formed with a long and thin rectangular shape having its length direction along the vehicle width direction, and opening toward the windshield glass 12.

As illustrated in FIG. 2, the air conditioning unit 24 is provided inside the instrument panel 16, and a soundproofing mechanism is configured that includes the air conditioning unit 24. A first nozzle 25 and a second nozzle 27 extend out from the air conditioning unit 24. The first nozzle 25 extends toward the vehicle rear from a vehicle rear face of the air conditioning unit 24 and is connected to the central blower outlet 20. Air that has been regulated in temperature by the air conditioning unit 24 thereby passes through the first nozzle 25 and is blown out into the vehicle cabin through the central blower outlet 20.

The second nozzle 27 extends toward the vehicle upper side from an upper face of the air conditioning unit 24 and is connected to the defroster blower outlet 22. Air that has been regulated in temperature by the air conditioning unit 24 thereby passes through the second nozzle 27 and is blown out along the windshield glass 12 through the defroster blower outlet 22. This thereby achieves a configuration to clear condensation on the windshield glass 12.

The air conditioning unit 24 is electrically connected to an Electronic Control Unit (ECU) 26, serving as a controller, and the air conditioning unit 24 is controlled by the ECU 26. Specifically, the volume and flow rate at which air from the air conditioning unit 24 passes through the second nozzle 27 and is blown out through the defroster blower outlet 22 is controlled.

Note that the present exemplary embodiment is configured such that the volume and flow rate at which air is blown out through the defroster blower outlet 22 and along the windshield glass 12 is different from the volume and flow rate of air employed in a normal defroster so as to provide soundproofing. For example, assuming that most of the noise generated in a vehicle cabin is between 300 Hz and 3000 Hz, the present exemplary embodiment is configured so as to be capable of blowing air at a sufficient volume and flow rate to dissipate the highest frequency 3000 Hz soundwaves.

Moreover, a non-illustrated switch for switching soundproofing mode is provided to the instrument panel 16 in a configuration in which a soundproofing mode can be switched ON and OFF by operating the switch.

The ECU 26 controls the air conditioning unit 24 so that soundproofing air is blown from the air conditioning unit 24 in cases in which a predetermined condition has been satisfied. Specifically, the ECU 26 enables operation of a soundproofing mechanism when the vehicle 10 is stationary, and disables operation of the soundproofing mechanism when the vehicle 10 is traveling. Explanation follows regarding this control method, according to the flowchart in FIG. 3.

At step S200 in FIG. 3, determination is made as to whether or not the vehicle 10 is in a stationary state. Processing transitions to step S202 in cases in which the vehicle 10 is in a stationary state. In cases in which the vehicle 10 is not in a stationary state, the check as to whether or not the vehicle 10 is in a stationary state is repeated. Various methods may be employed to determine whether or not the vehicle is in a stationary state. For example, the vehicle 10 may be determined to be in a stationary state based on a signal indicating that a shift lever is in a parking state. Alternatively, determination may be made that the vehicle 10 is in a stationary state based on a speedometer indicating that the vehicle speed is zero. Alternatively, the vehicle 10 may be determined to be in a stationary state when an ignition switch (IG) is OFF.

At step S202, a check is made as to whether the soundproofing mode has been set to ON or OFF. At step S204, determination is made as to whether or not the soundproofing mode is ON. In the present exemplary embodiment, this is performed by determining whether or not the switch for switching soundproofing mode provided to the instrument panel 16 is ON. Processing transitions to step S206 in cases in which the soundproofing mode is ON. Processing returns to step S200 in cases in which the soundproofing mode is OFF.

At step S206, the soundproofing mechanism is operated by the ECU 26. In the present exemplary embodiment, the air conditioning unit 24 is activated as described above by activation of the soundproofing mechanism, such that air starts to be blown along the windshield glass 12 through the defroster blower outlet 22 at the volume and flow rate employed for soundproofing. Sound in the vicinity of the windshield glass 12 is thereby dissipated, suppressing sound from leaking outside from the vehicle.

At step S208, determination is then made as to whether or not the vehicle 10 is in a stationary state. Processing transitions to step S210 in cases in which the vehicle 10 continues to be in a stationary state while the soundproofing mechanism is being operated. In cases in which the vehicle 10 is no longer in a stationary state, processing transitions to step S214 and the soundproofing mechanism is stopped. Namely, in the present exemplary embodiment, the air conditioning unit 24 is forcefully stopped, even though the soundproofing mechanism is still in the operational state, in cases in which the vehicle 10 has left the stationary state.

At step S210, a check is made as to whether the soundproofing mode has been set to ON or OFF. Determination is made at step S212 as to whether or not the soundproofing mode is now OFF. In cases in which the soundproofing mode is not OFF (i.e. ON), processing returns to step S208, and the continuing operational state of the soundproofing mechanism is maintained. Cases in which the soundproofing mode is OFF are cases in which the switch for switching soundproofing mode has been switched OFF by operation by an occupant, for example, while the soundproofing mechanism is in the operational state, and so processing transitions to step S214 and the air conditioning unit 24 is stopped.

Operation

Explanation follows regarding operation of the present exemplary embodiment.

In the vehicle soundproofing structure according to the present exemplary embodiment, the ECU 26 enables operation of the soundproofing mechanism when the vehicle 10 is in a stationary state. Namely, the vehicle 10 can be set to a soundproof state by using the air conditioning unit 24. However, in cases in which determination is made that the vehicle 10 is not in a stationary state, such as when the vehicle 10 is traveling, operation of the soundproofing mechanism is disabled. Namely, soundproofing by the air conditioning unit 24 is disabled. This enables sound inside the vehicle cabin to be dissipated as required when the vehicle 10 is stationary, and sound to be suppressed from leaking outside the vehicle.

The reason operation of the soundproofing mechanism is disabled when the vehicle 10 is traveling is so that sound outside the vehicle whilst traveling can be suppressed from becoming difficult to hear. Namely, switching between a soundproof state and a non-soundproof state can be made at a suitable timing. In particular, in cases in which the vehicle 10 has started traveling while in the soundproof state, the soundproof state is exited without any particular operation being performed by the occupant, so that there is no concern that the vehicle 10 might be driven in a state in which sound outside the vehicle is difficult to hear.

Note that although soundproofing of the windshield glass 12 has been described for the present exemplary embodiment, application may be made to the glass of a window in other locations. For example, application may be made to side glass of a vehicle side section (front side-glass, rear side-glass), or to rear-door glass of a vehicle rear section. In such cases, a soundproof state may be achieved by forming a defroster blower outlet in door trim or the like, and blowing air along the glass through the defroster blower outlet.

Second Exemplary Embodiment

Explanation follows regarding a vehicle soundproofing structure according to a second exemplary embodiment. Note that configuration similar to that of the first exemplary embodiment is appended with the same reference numerals, and explanation thereof is omitted as appropriate.

Figure 5B:
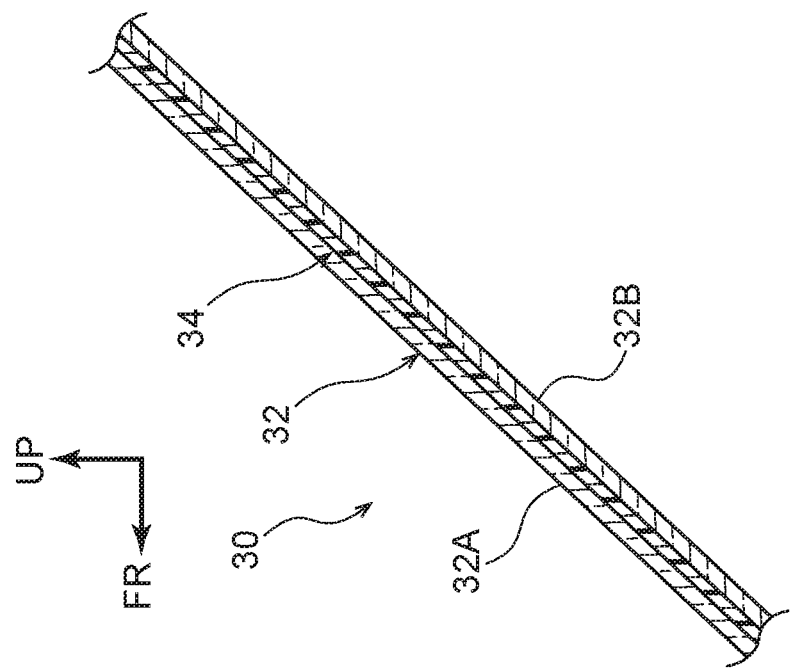
FIG. 5B is a cross-section corresponding to FIG. 5A when a soundproofing mechanism is in a non-operational state.
Figure 5A:
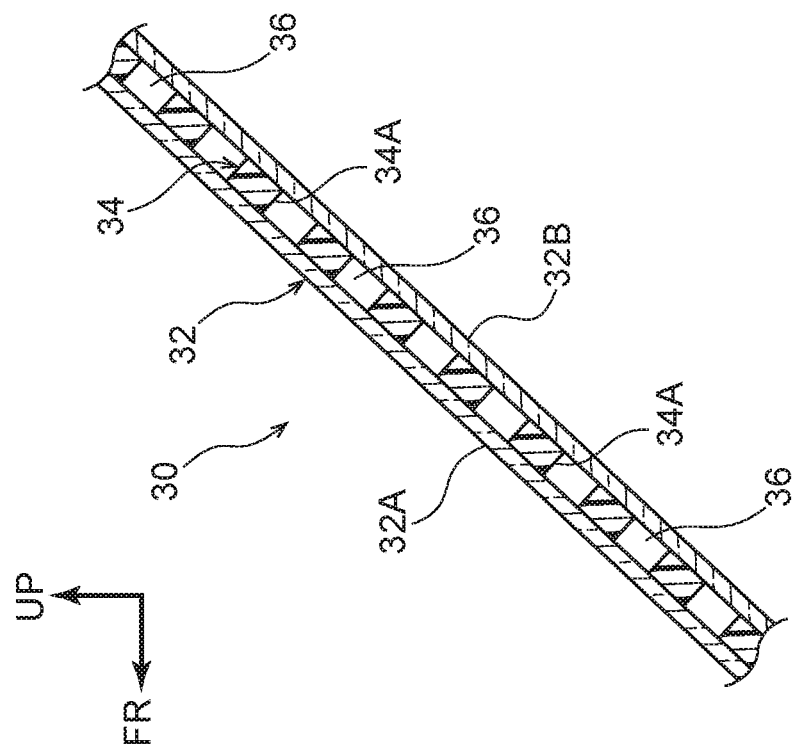
FIG. 5A is a cross-section sectioned along line 5A-5A in FIG. 4.

As illustrated in FIG. 4, windshield glass 32 partitioning between the interior and exterior of a vehicle cabin is provided to a vehicle 30 applied with the vehicle soundproofing structure according to the present exemplary embodiment. Note that as illustrated in FIG. 5A, the windshield glass 32 of the present exemplary embodiment is configured including a pair of glass panes 32A, 32B disposed with a spacing therebetween.

The glass pane 32A is positioned at the vehicle outer side, and the glass pane 32B is disposed at a spacing on the vehicle inner side of the glass pane 32A so as to be substantially parallel to the glass pane 32A. A gap is thereby formed between the glass pane 32A and the glass pane 32B.

Note that a transparent member 34, formed of an electrically conductive polymer actuator, is provided between the glass pane 32A and the glass pane 32B. The transparent member 34 is filled into the entire region of the windshield glass 32. When an electric field is applied to the transparent member 34, the transparent member 34 curves due to a negative electrode side thereof swelling and a positive electrode side thereof contracting. Namely, the transparent member 34 functions as a transparent actuator.

Figure 6B:
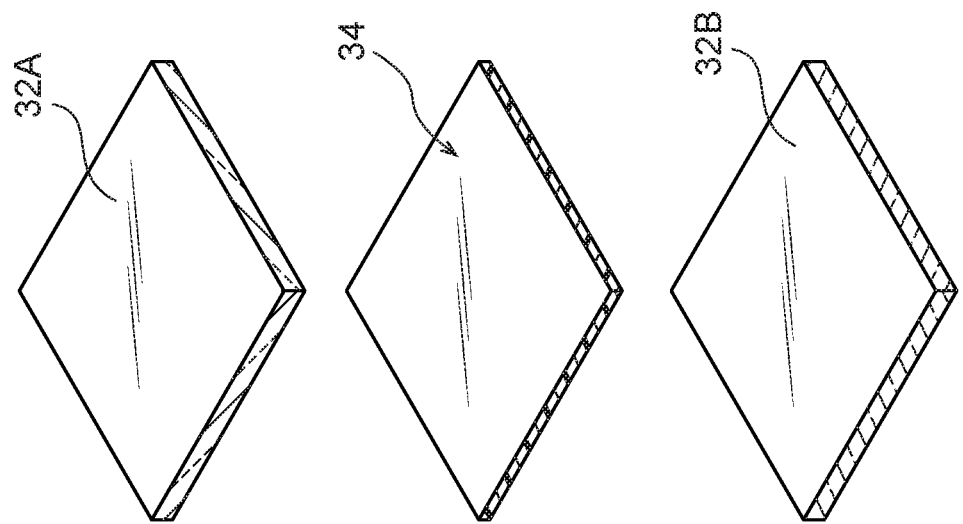
FIG. 6B is a schematic diagram to explain a state in which a soundproofing mechanism of a vehicle soundproofing structure according to the second exemplary embodiment is in a non-operational state.

FIG. 6B illustrates the transparent member 34 of the present exemplary embodiment maintaining a sheet shaped profile in a normal state, prior to application of an electric field. Thus the glass pane 32A, the glass pane 32B, and the transparent member 34 are integrated together in the normal state, such that the windshield glass 32 functions as a single pane of glass.

Figure 6A:
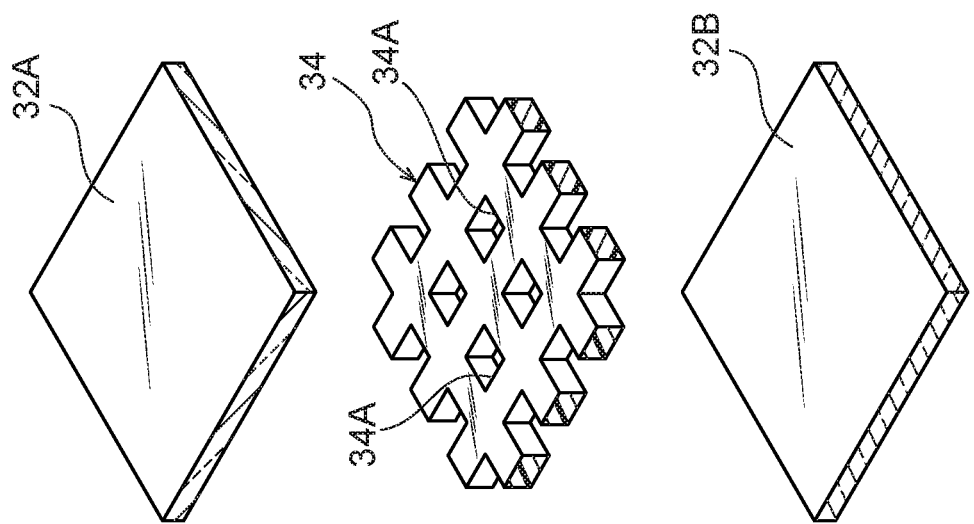
FIG. 6A is a schematic diagram to explain a state in which a soundproofing mechanism of a vehicle soundproofing structure according to the second exemplary embodiment is being operated.

However, as illustrated in FIG. 6A, when an electric field is applied to the transparent member 34, the transparent member 34 is deformed into a lattice shape, and plural through-holes 34A are formed therein. Note that due to the volume of the transparent member 34 not changing, the transparent member 34 becomes slightly thicker when deformed into a lattice shape. Note that in the present exemplary embodiment, one out of the glass pane 32A or the glass pane 32B is configured so as to be capable of moving. The gap between the glass pane 32A and the glass pane 32B accordingly widens as the thickness of the transparent member 34 increases. Thus, as illustrated in FIG. 5A, in a state in which the transparent member 34 has deformed into a lattice shape, air layers 36 are formed between the glass pane 32A and the glass pane 32B by the through-holes 34A.

Note that a non-illustrated power source is provided to the transparent member 34 to apply voltage to the transparent member 34, and the ECU 26 (see FIG. 2) is electrically connected to the power source. The soundproofing mechanism of the present exemplary embodiment is operated according to the flowchart in FIG. 3, similarly to in the first exemplary embodiment. Namely, the ECU 26 activates the soundproofing mechanism when the vehicle 30 is stationary and the soundproofing mode is switched ON, so as to apply an electric field to the transparent member 34, and to deform the transparent member 34 into a lattice shape.

Operation

Explanation follows regarding operation of the present exemplary embodiment.

In the vehicle soundproofing structure according to the present exemplary embodiment, soundproofing is performed by deforming the transparent member 34. This enables the situation outside the vehicle to be viewed through the windshield glass 32, even in the soundproof state. Namely, the situation outside the vehicle can be viewed while suppressing sound from leaking outside from the vehicle. Other operation and effects are similar to those of the first exemplary embodiment.

Note that although soundproofing of the windshield glass 32 has been described for the present exemplary embodiment, application may be made to the glass of a window in other locations. For example, the present exemplary embodiment may be applied to side glass of a vehicle side section (front side-glass, rear side-glass), or to rear-door glass of a vehicle rear section. In such cases, a double-glazed structure may be adopted for each window glass, and a transparent member disposed therebetween.

Third Exemplary Embodiment

Explanation follows regarding a vehicle soundproofing structure according to a third exemplary embodiment. Note that configuration similar to that of the first exemplary embodiment is appended with the same reference numerals, and explanation thereof is omitted as appropriate.

As illustrated in FIG. 7, a front side-glass 42 and a rear side-glass 44 partitioning between the interior and exterior of a vehicle cabin are provided to a side section of a vehicle 40 applied with the vehicle soundproofing structure according to the present exemplary embodiment. As illustrated in FIG. 8, the front side-glass 42 is configured at an upper portion of a front side door 46, and is capable of opening and closing in the vertical direction. The rear side-glass 44 is configured at an upper portion of a rear side door 48 at the vehicle rear of the front side-glass 42, and is also capable of opening and closing in the vertical direction.

Note that as illustrated in FIG. 7, a first sunshade 50 is provided at the vehicle cabin interior side of the front side door 46. The first sunshade 50 is stowable inside a non-illustrated door trim of the front side door 46 so as to be deployable along the front side-glass 42.

A second sunshade 52 is provided at the vehicle cabin interior side of the rear side door 48. The second sunshade 52 is stowable inside a non-illustrated door trim of the rear side door 48 so as to be deployable along the rear side-glass 44.

Due to the first sunshade 50 and the second sunshade 52 being formed from a soundproofing material, soundproofing performance is enhanced by deploying the first sunshade 50 and the second sunshade 52. Note that for ease of explanation, FIG. 7 omits illustration of the front side door 46 other than the front side-glass 42, and omits illustration of the rear side door 48 other than the rear side-glass 44. A known soundproofing material may be employed as the soundproofing material. Similar applies to a third sunshade 58, described below.

As illustrated in FIG. 8, a rear-door glass 54 partitioning between the interior and exterior of the vehicle cabin is provided at a vehicle rear section. The rear-door glass 54 configures an upper portion of a rear door 56. The third sunshade 58 is provided at the vehicle cabin interior side of the rear-door glass 54.

The third sunshade 58 is formed of soundproofing material, is stowable inside a non-illustrated door trim of the rear door 56 so as to be deployable along the rear-door glass 54. The soundproofing mechanism of the present exemplary embodiment is configured including the first sunshade 50, the second sunshade 52, and the third sunshade 58.

A deployment mechanism for electrically deploying or stowing the first sunshade 50 is provided inside the door trim of the front side door 46. A deployment mechanism for electrically deploying or stowing the second sunshade 52 is provided inside the door trim of the rear side door 48. A deployment mechanism for electrically deploying or stowing the third sunshade 58 is provided inside the door trim of the rear door 56.

The respective deployment mechanisms are electrically connected to the ECU 26 (see FIG. 2). In the present exemplary embodiment, similarly to in the first exemplary embodiment, the first sunshade 50, the second sunshade 52, and the third sunshade 58 are deployed by their respective deployment mechanisms when the soundproofing mechanism has been activated according to the flowchart in FIG. 3. A soundproof state is thereby realized.

Operation

Explanation follows regarding operation of the present exemplary embodiment.

In the vehicle soundproofing structure according to the present exemplary embodiment, when the vehicle 40 is stationary, as well as sunlight being blocked by the first sunshade 50, the second sunshade 52, and the third sunshade 58, sound can also be suppressed from leaking outside from the vehicle thereby. Other operation and effects are similar to those of the first exemplary embodiment.

Note that although soundproofing of the front side-glass 42, the rear side-glass 44, and the rear-door glass 54 has been described for the present exemplary embodiment, application may be made to the windshield glass. For example, a soundproof state of the windshield glass can be realized by deploying a sunshade stowed inside an instrument panel positioned below the windshield glass.

Fourth Exemplary Embodiment

Explanation follows regarding a vehicle soundproofing structure according to a fourth exemplary embodiment. Note that configuration similar to that of the first exemplary embodiment is appended with the same reference numerals, and explanation thereof is omitted as appropriate.

As illustrated in FIG. 9, a front seat 62 is provided inside a vehicle cabin of a vehicle 60 applied with the vehicle soundproofing structure according to the present exemplary embodiment. The front seat 62 is configured including a seat cushion 64, a seatback 66, and a headrest 67. A front side door 68 partitioning between the interior and exterior of the vehicle cabin is provided at the vehicle width direction outer side of the front seat 62.

An upper portion of the front side door 68 is configured by front side-glass 70 that is capable of opening and closing in the vertical direction. An exciter 72, serving as a vibrator, is attached to the front side-glass 70. The front side-glass 70 accordingly functions as a diaphragm by causing the exciter 72 to vibrate.

Note that although the exciter 72 is attached to a lower end of a vehicle front-rear direction center portion of the front side-glass 70 in the present exemplary embodiment, there is no limitation thereto, and the exciter 72 may be attached to another location. For example, from the perspective of styling, the exciter 72 can be made non-visible from outside the vehicle by performing ceramic processing on a peripheral edge of the front side-glass 70, providing a black-coated portion thereon, then attaching the exciter 72 to the black-coated portion.

A microphone 74 to receive sound inside the vehicle cabin is provided to a door trim 73 of the front side door 68. The exciter 72 and the microphone 74 are electrically connected to the ECU 26 (see FIG. 2). The ECU 26 then causes the exciter 72 to vibrate at a frequency corresponding to the sound input from the microphone 74 when the soundproofing mechanism is operated, causing the front side-glass 70 to vibrate. When this is performed, the front side-glass 70 is caused to vibrate so as to be in the opposite phase to the sound inside the vehicle cabin, cancelling sound inside the vehicle cabin, and suppressing the sound inside the vehicle cabin from leaking outside from the vehicle.

The present exemplary embodiment is configured such that the soundproofing mechanism is operated according to the flowchart in FIG. 3, similarly to the first exemplary embodiment. Namely, the ECU 26 activates the soundproofing mechanism when the vehicle 60 is stationary and the soundproofing mode is switched ON, thereby causing the exciter 72 to vibrate.

Operation

Explanation follows regarding operation of the present exemplary embodiment.

In the vehicle soundproofing structure according to the present exemplary embodiment, causing the exciter 72 attached to the front side-glass 70 to vibrate causes the front side-glass 70 to vibrate, enabling sound inside the vehicle cabin to be cancelled. Namely, a soundproof state can be realized. Moreover, picking up voices etc. inside the vehicle cabin using the microphone 74 enables the frequency of the sound to be cancelled to be accurately ascertained, enabling soundproofing performance to be enhanced. In particular, for example, in cases in which music is being played inside the vehicle cabin and an occupant is singing in accompaniment to the music, the frequency of the sound to be generated can be ascertained in advance, enabling the exciter 72 to be vibrated so as to match the frequency of sound generated even without employing the microphone 74. Other operation and effects are similar to those of the first exemplary embodiment.

Note that soundproofing of the front side-glass 70 has been described for the present exemplary embodiment, application may be made to the glass of a window in other locations. For example, soundproofing may be applied to windshield glass at a vehicle front section, to rear side-glass at a vehicle side section, or to rear-door glass at a vehicle rear section. In such cases, the exciter 72 may be attached to the respective glass pane. The microphone 74 may also receive sound at one location, or plural microphones 74 may be provided.

Vehicle soundproofing structures according to exemplary embodiments have been explained above. However, various embodiments may obviously been implemented within a range not departing from the spirit of the present disclosure. For example, although sound in the vicinity of the windshield glass 12 is dissipated by air being blown through the defroster blower outlet 22 at a predetermined volume and flow rate in the first exemplary embodiment, there is no limitation thereto. As another method, a method may be adopted in which the volume of air is changed intermittently so as to generate a predetermined blowing sound that masks sound inside the vehicle cabin. Specifically, a high-pitched sound inside the vehicle cabin can be blocked by generating a low-pitched sound through the defroster blower outlet 22.

As illustrated in FIG. 5A, although the air layers 36 between the glass pane 32A and the glass pane 32B are formed by deforming the transparent member 34 into a lattice shape in the second exemplary embodiment, there is no limitation thereto, and the transparent member 34 may be configured so as to be deformed into another shape. A soundproof state can be achieved as long as the air layers 36 are formed between the glass pane 32A and the glass pane 32B by deforming the transparent member 34.

Moreover, although a configuration is adopted in the fourth exemplary embodiment in which the exciter 72 is attached to the front side-glass 70 and the front side-glass 70 is caused to vibrate in the opposite phase, there is no limitation thereto. For example, the exciter 72 may be attached to the sunshade explained in the third exemplary embodiment. In such cases, the exciter 72 is hidden when the sunshade is in the stowed state, enhancing styling.

Furthermore, the exciter 72 may be attached to the door trim 73 of the front side door 68. A soundproof state can be achieved as long as the door trim 73 is caused to vibrate in the opposite phase to the sound inside the vehicle cabin.

A configuration may be adopted in which soundwaves are emitted toward the windshield glass etc. by causing a glass pane, a door trim, or the like to function as a diaphragm using the exciter 72. In such cases, a soundproof state can be achieved by causing the glass pane or the door trim to vibrate in the opposite phase to the sound inside the vehicle cabin in the vicinity of the windshield glass, even in cases in which the soundproofing mechanism is not provided to the windshield glass itself.

The soundproofing mechanisms of the first exemplary embodiment to the fourth exemplary embodiment may be combined. For example, the first exemplary embodiment and the second exemplary embodiment may be combined in a configuration that includes both a soundproofing structure using blown air and a soundproofing structure using a transparent member.

What is claimed is:

1. A vehicle soundproofing structure comprising:
   a soundproofing mechanism configured to suppress sound from leaking outside from a vehicle by absorbing, dissipating, or cancelling sound inside a vehicle cabin; and
   a controller configured to operate the soundproofing mechanism when the vehicle is stationary, and to disable operation of the soundproofing mechanism when the vehicle is travelling.

2. The vehicle soundproofing structure of claim 1, wherein the soundproofing mechanism:

includes an air moving device that blows air along a glass pane partitioning between an interior and an exterior of the vehicle cabin; and dissipates sound in a vicinity of the glass pane by blowing air out from the air moving device.

3. The vehicle soundproofing structure of claim 1, wherein the soundproofing mechanism:

includes a vibrator attached to a glass pane partitioning between an interior and an exterior of the vehicle cabin, and a microphone to receive sound inside the vehicle cabin; and vibrates the vibrator to thereby cause the glass pane to vibrate at a frequency corresponding to the sound received by the microphone and cancel the sound.

4. The vehicle soundproofing structure of claim 1, wherein:

the soundproofing mechanism includes a sunshade that is stowed so as to be deployable along a glass pane partitioning between an interior and an exterior of the vehicle cabin, and that is formed of a soundproofing material.

5. The vehicle soundproofing structure of claim 1, further comprising a pair of glass panes partitioning between an interior and an exterior of the vehicle cabin and disposed with a spacing between each other, wherein the soundproofing mechanism:

is configured including a transparent member that is a deformable electrically conductive polymer actuator filled in a space between the glass panes; and soundproofs by deforming the transparent member to form an air layer between the glass panes.

\* \* \* \* \*